(12) United States Patent
Kozu et al.

(10) Patent No.: US 7,972,721 B2
(45) Date of Patent: Jul. 5, 2011

(54) METHOD FOR MANUFACTURING BATTERY PACK

(75) Inventors: Katsumi Kozu, Sanda (JP); Takeshi Ishimaru, Moriguchi (JP); Yoshiki Osawa, Suita (JP); Satoshi Kataoka, Takaoka-gun (JP); Iichiro Mori, Itami (JP); Koichi Toriyama, Moriguchi (JP); Masahiro Mizuta, Souraku-gun (JP); Tatsuhisa Chikada, Hirakata (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/502,824

(22) PCT Filed: Feb. 6, 2003

(86) PCT No.: PCT/JP03/01270
§ 371 (c)(1),
(2), (4) Date: Jul. 27, 2004

(87) PCT Pub. No.: WO03/069697
PCT Pub. Date: Aug. 21, 2003

(65) Prior Publication Data
US 2005/0112456 A1 May 26, 2005

(30) Foreign Application Priority Data

Feb. 13, 2002 (JP) .................. 2002-034927
Oct. 15, 2002 (JP) .................. 2002-300515

(51) Int. Cl.
*H01M 2/08* (2006.01)

(52) U.S. Cl. ............ 429/184; 429/7; 429/162; 429/163; 429/185; 264/272.21

(58) Field of Classification Search ............... 29/246, 29/623.1, 623.2, 623.3, 623.4, 623.5, 730–731
See application file for complete search history.

(56) References Cited

U.S. PATENT DOCUMENTS

| | | | | |
|---|---|---|---|---|
| 3,948,441 A | * | 4/1976 | Perkins et al. | 236/46 R |
| 4,973,936 A | * | 11/1990 | Dimpault-Darcy et al. | 338/32 R |
| 5,766,790 A | * | 6/1998 | Kameishi et al. | 429/56 |
| 6,114,942 A | * | 9/2000 | Kitamoto et al. | 338/22 R |
| 6,177,209 B1 | * | 1/2001 | Okutoh | 429/62 |
| 6,210,824 B1 | | 4/2001 | Sullivan et al. | |
| 6,432,575 B1 | * | 8/2002 | Yamagami | 429/100 |
| 6,451,474 B1 | * | 9/2002 | Kozu et al. | 429/100 |
| 6,492,058 B1 | | 12/2002 | Watanabe | |

(Continued)

FOREIGN PATENT DOCUMENTS

EP 1 403 942 3/2004

(Continued)

OTHER PUBLICATIONS

Machine translation of JP 2000-315483.*

(Continued)

*Primary Examiner* — Cynthia Lee
(74) *Attorney, Agent, or Firm* — Jordan and Hamburg LLP

(57) ABSTRACT

A heat insulation sheet (16) covers a temperature fuse (10) arranged on a sealing plate (23) of a rechargeable battery (2) so as to provide a shield from heat of resin that is filled in a gap between the rechargeable battery (2) and a circuit substrate (3) to form a primary mold (11) and to prevent destruction of the temperature fuse (10) caused by the heat.

22 Claims, 12 Drawing Sheets

U.S. PATENT DOCUMENTS

| | | | |
|---|---|---|---|
| 6,503,647 | B1 | 1/2003 | Sugiyama |
| 6,524,732 | B1 * | 2/2003 | Iwaizono et al. .................. 429/7 |
| 6,783,883 | B1 * | 8/2004 | Koschany ........................ 429/36 |
| 6,824,917 | B2 * | 11/2004 | Aaltonen et al. ................. 429/97 |
| 6,994,926 | B2 * | 2/2006 | Ikeuchi et al. .................... 429/7 |
| 2003/0082441 | A1 * | 5/2003 | Hovi et al. .................... 429/123 |
| 2005/0106454 | A1 | 5/2005 | Kozu et al. |
| 2005/0112456 | A1 | 5/2005 | Kozu et al. |
| 2005/0151514 | A1 | 7/2005 | Kozu et al. |

FOREIGN PATENT DOCUMENTS

| | | | |
|---|---|---|---|
| EP | 1 422 771 | | 5/2004 |
| JP | 62-184760 | | 8/1987 |
| JP | 63-19774 | | 1/1988 |
| JP | 64-72458 | | 3/1989 |
| JP | 64-072458 | | 3/1989 |
| JP | 05-159758 | * | 6/1993 |
| JP | 07-057721 | * | 3/1995 |
| JP | 8-162078 | | 6/1996 |
| JP | 09-134714 | * | 5/1997 |
| JP | 2000-311667 | | 11/2000 |
| JP | 2000-315483 | | 11/2000 |
| JP | 2001-057205 | | 2/2001 |
| JP | 2002-110121 | | 4/2002 |
| JP | 2002-134077 | | 5/2002 |
| JP | 2002-166447 | | 6/2002 |
| JP | 2002-260609 | | 9/2002 |
| JP | 2002-373630 | | 12/2002 |
| JP | 2003-17022 | | 1/2003 |
| JP | 2003-017022 | | 1/2003 |
| JP | 2003-022789 | | 1/2003 |
| JP | 2003-22789 | | 1/2003 |
| JP | 2003-086159 | | 3/2003 |
| JP | 2003-86159 | | 3/2003 |
| JP | 2003-132860 | | 5/2003 |
| JP | 2003-132861 | | 5/2003 |
| JP | 2003-162987 | | 6/2003 |
| WO | WO 01-99211 | * | 12/2001 |
| WO | WO-03/003485 | | 1/2003 |

OTHER PUBLICATIONS

Definition of polyurethane, Hawley's Condensed Chemical Dictionary, 14th edition, 2002, John Wiley & Sons, Inc.*

* cited by examiner

METHOD FOR MANUFACTURING BATTERY PACK

TECHNICAL FIELD

The present invention relates to a battery pack in which constituent elements are united by filling with resin to reduce size and improve rigidity so that it is suitable as a power source for portable electronic equipment, and a manufacturing method thereof.

BACKGROUND ART

With the remarkable development of small, thin, and high-functionality portable electronic equipment such as mobile phones and PDAs, there is a growing demand for smaller, thinner, and high-capacity batteries as their power source. Lithium ion rechargeable batteries can be designed small and high-capacity, and in particular, flat prismatic types are suitable in making the equipment thinner; they have therefore been increasingly used as the repeatedly usable rechargeable battery for portable electronic equipment.

Because lithium ion rechargeable batteries have high energy density and contain a flammable organic solvent as electrolyte, it is essential to take account of safety measures. They must have such safety features as to ensure that no damage is caused to the equipment or injury to the user in the event that an abnormality arises for some reason. For example, if the positive and negative terminals of the battery are short-circuited for some reason, a large short-circuit current flows in high energy density batteries, whereupon the inner resistance generates Joule heat and the battery temperature rises. A temperature rise in the battery leads to a rapid increasing of inner gas pressure caused by reactions between positive electrode active materials and electrolyte, or from evaporation or decomposition of electrolyte, which results in fire or explosion of the battery. Batteries may fall into a high-temperature state not only because of external short-circuiting but also of overcharge; the same applies if the portable electronic equipment loaded with the battery is placed near a heater or left inside a car parked in a hot weather environment.

A battery abnormality can be induced by any of electrical, mechanical, or thermal factors; thus non-aqueous electrolyte batteries represented by lithium ion rechargeable batteries are provided with safety features for preventing batteries from falling into an abnormal state and for evading a further dangerous state even if an abnormality should arise. Such features are usually incorporated in batteries as their own natures; for example, active materials on the electrodes and electrolyte may be made not to be excessively reactive, or, a polyolefin porous film may be employed for the separator because of its "shutdown function," in which minute pores are softened and close under an abnormally high temperature. Cylindrical lithium ion rechargeable batteries are usually provided with a protective feature such as a Positive Temperature Coefficient (PTC) element connected in series to the input/output circuit at the sealing end, which limits current flow in the event of external short-circuiting. Batteries that do not have a sufficient space for the PTC element inside are normally provided with a PTC element or temperature fuse as outside circuit components. Further, a circuit for protecting the battery from overcharge and over discharge is an absolute requirement. In general, these constituent elements are all packed with the battery inside a pack case to form a battery pack.

However, battery packs using pack cases are not suited to portable electronic equipment that are re-modeled in short cycles, because the manufacturing cost of molding dies used in the resin molding of pack cases tends to be high, and the time required for designing new molding dies is relatively long. Battery packs with resin-molded outer cases also have limitations in making portable electronic equipment smaller and thinner because of the limitations on the moldable thickness in the resin molding process.

Furthermore, in order to prevent the user from disassembling a battery pack for wrong use or for satisfying curiosity, it must have a design that is hardly disassemblable, or a design that alerts the user that it has been disassembled. Taking account that the battery packs are used for portable electronic equipment, they also need to have a rigid structure that can withstand vibration or shocks in a falling accident, and a moisture resistance, particularly for the electronic circuit parts. In achieving the structure having a disassemblability, a certain rigidity, and a moisture resistant, the idea has emerged that a battery may be united with a circuit substrate including a battery protective circuit by resin molding.

Such resin-molded battery packs described above are disclosed in Japanese Laid-Open Patent Publications Nos. 2002-134077 and 2002-166447, in which a battery and a circuit substrate are connected by a connecting member to form an intermediate product, which is placed inside a die, and resin is filled around the intermediate product such as to expose external terminals formed on the circuit substrate to the outside.

Japanese Laid-Open Patent Publication No. 2000-315483 discloses a structure in which a battery and a circuit substrate are connected by a connecting member and placed inside a die, and the circuit substrate is resin-sealed and fixed on the battery or its pack case (battery lid), or both the circuit substrate and the battery are resin-sealed.

Battery packs of lithium ion rechargeable batteries are normally provided with a battery protection feature that prevents a temperature rise caused by external short-circuiting or overcharge as mentioned above, and in addition, they are provided with a heat sensitive element such as a temperature fuse or PTC element that cuts the battery circuit as a backup safety feature in the event that the protective feature has not functioned.

Because the heat sensitive element is heat-coupled to the rechargeable battery so that it operates not only in an over current condition but also upon a change in the battery temperature, and connected to the circuit that connects the rechargeable battery with the circuit substrate, a measure must be taken so that the heat sensitive element is not destroyed by the heat of the resin filled between the rechargeable battery and the circuit substrate during the resin molding. Generally, temperature fuses have a fusion temperature of 104° C.; on the other hand, the temperature of molten resin, even though it is a hot melt resin that melts at a relatively low temperature, exceeds 200° C. While hot melt resins have a lower melting temperature than other molding resins and allow easy handling, the melting temperature is still much higher than the fusion temperature of the temperature fuse. A direct contact of molten hot melt resin with the temperature fuse will certainly induce fusion, whereby the circuit in the battery pack will be cut and not properly function. In the case with a PTC element, hot resin of more than 200° C. will change the bridging structure of the conductive polymer that is a chief component of the PTC element, whereby the temperature-current characteristics and trip temperature will be affected and the reliability of the PTC element will be deteriorated. Accordingly, in the production of battery packs of a rechargeable battery and a circuit substrate united by filling with resin with safety features using heat sensitive elements, it is an absolute requirement to provide measures to prevent destruction of the heat sensitive elements.

It is an object of the invention to provide a battery pack of a battery and a circuit substrate that are united by resin molding, the battery pack having a structure that prevents a heat sensitive element provided as a safety feature from being destroyed by filled resin, and a manufacturing method thereof.

DISCLOSURE OF THE INVENTION

To achieve the above object, a battery pack according to a first aspect of the present invention comprises a substrate formed with an external terminal that is arranged on a sealing plate side of a rechargeable battery with a gap therebetween and united with the rechargeable battery by resin filled in that gap; and a heat sensitive element heat-coupled to the rechargeable battery that is arranged in the gap and provided with a heat shield by constituent elements of the battery pack except for the molded resin. The constituent elements other than the resin such as connection leads and insulation sheets are arranged to surround the heat sensitive element so that they provide a shield from heat of the resin when molten or softened resin of high temperature is filled in the gap, whereby a direct contact of the high-temperature resin with the heat sensitive element is avoided, and destruction or deterioration of the functions and characteristics of the heat sensitive element is prevented. Moreover, because the heat sensitive element is heat-coupled to the rechargeable battery, the precision in sensing the rechargeable battery temperature is high. This feature is characteristic of the invention, i.e., even with the characteristic structure of the battery pack of the invention in which the heat sensitive element is arranged in the gap between the rechargeable battery and the substrate and resin is filled between in this gap, an improvement is made in the precision in sensing the battery temperature. The heat-coupling is achieved by a direct contact between the rechargeable battery and the heat sensitive element so that the heat sensitive element senses the heat of the rechargeable battery and detects its temperature with high precision. Alternatively, the heat-coupling may be achieved by a heat conductive, insulating material such as silicon resin interposed between the rechargeable battery and the heat sensitive element. Insulation is thereby provided between the rechargeable battery and the heat sensitive element. It is also preferable in terms of sensing precision because the heat conductivity will be much better than by simply making contact.

A battery pack according to a second aspect of the present invention comprises a substrate formed with an external terminal that is arranged opposite a rechargeable battery with a gap therebetween and united with the rechargeable battery by resin filled in that gap; and a heat sensitive element heat-coupled to the rechargeable battery that is arranged in the gap and covered by a heat insulation member. Because the heat sensitive element is covered by the heat insulation member, resin does not contact the heat sensitive element directly when it is filled between the rechargeable battery and the circuit substrate and flows onto the heat sensitive element. Since heat conduction from the resin to the heat sensitive element is suppressed by the heat insulation member, destruction of the heat sensitive element during the resin molding in the process of forming the battery pack is prevented. The heat insulation member is typically a sheet of known heat insulating materials such as resins and inorganic substances; it should provide a heat shield for the heat sensitive element, as well as have insulation relative to the constituent elements such as connection leads and the like arranged in the gap. The heat sensitive element may be covered by a heat insulating resin material instead of providing the heat insulation sheet. Either way, the heat sensitive element is electrically connected to one of the positive and negative electrodes of the rechargeable battery, heat-coupled to the rechargeable battery, and set in a predetermined position. After that, the heat sensitive element is covered by the heat insulation member by a process of arranging the heat insulation sheet to cover the heat sensitive element, or, covering the heat sensitive element by a resin material.

A battery pack according to a third aspect of the present invention comprises a substrate formed with an external terminal that is arranged on a sealing plate side of a rechargeable battery with a gap therebetween and united with the rechargeable battery by resin filled in that gap; and a heat sensitive element heat-coupled to the rechargeable battery that is arranged in a recess formed in the sealing plate and provided with a heat insulation member or other constituent elements covering the recess. Because the heat sensitive element is arranged in the recess that is covered by other constituent elements, the filled resin does not contact the heat sensitive element, and the battery pack is formed without the risk of destroying the heat sensitive element with the heat of molten resin during the resin filling. Further, heat of the rechargeable battery is well conducted to the heat sensitive element because it is arranged in the recess, and it operates swiftly in response to an abnormal temperature rise in the rechargeable battery.

A battery pack according to a fourth aspect of the present invention comprises a substrate formed with an external terminal that is arranged on a sealing plate side of a rechargeable battery with a gap therebetween and united with the rechargeable battery by resin filled in that gap;

and a heat sensitive element heat-coupled to the rechargeable battery that is arranged in the gap and formed with a heat insulation coating layer. The coating layer on the heat sensitive element has heat insulating properties, and a direct contact of the element with the high-temperature molten resin is avoided by arranging this side with the coating layer to contact the molten resin, whereby deterioration of its characteristics is prevented. With this structure, because the heat sensitive element is protected by the coating layer, there is no need of covering the element with a heat insulation member. By the elimination of the heat insulation means, the number of process steps and components in the production are reduced, whereby a cost reduction is achieved. The coating layer should preferably be made of a resin material having heat insulating properties. Further, the heat sensitive element should include a portion that is not provided with the coating layer so that it is contacted and heat-coupled to the rechargeable battery in that portion. Thus coating layer is not formed in the portion that is in contact with the rechargeable battery, whereby the heat sensitive element has both a heat shield during the resin molding and high sensing precision of the rechargeable battery temperature. In order to prevent an increase in the process steps and complication in the process of arranging the heat sensitive element on the rechargeable battery, a suitable resin material should be selected; it should be able to provide the heat shield effect during the short period of resin molding, and have thermal characteristics that do not cause a decrease in the sensing precision of the rechargeable battery temperature after the battery pack is complete. Thereby, the heat sensitive element has the heat shield and high sensing precision, and is provided with fewer process steps and at lower cost.

In any of the above structures, the heat sensitive element is typically a temperature fuse, which fuses and thereby cuts the battery circuit upon an abnormal temperature rise in the rechargeable battery, thus terminating the connection with the battery circuit that is causing the temperature rise. The heat sensitive element may also be a PTC element, which limits current flow in the event of external short-circuiting and stops current flow in the battery circuit by increasing resistance in response to an abnormal temperature rise in the rechargeable battery, thus terminating the connection with the battery circuit that is causing the temperature rise. The heat sensitive element may also be a bimetal thermostat, which cuts current flow upon a temperature rise in the event of external short-circuiting and limits current flow in the battery circuit by cutting the circuit in response to an abnormal temperature rise in the rechargeable battery, thus terminating the connection with the battery circuit that is causing the temperature rise.

A method for manufacturing a battery pack according to a fifth aspect of the present invention comprises: arranging a substrate formed with an external terminal that is connected to a rechargeable battery, opposite the rechargeable battery with a gap therebetween for forming an object to be resin packed, which is placed inside a die; and filling the gap with resin for uniting the rechargeable battery and the substrate, wherein the die in which the object to be resin packed is placed and resin is filled in the gap is formed of a material having good heat conductivity at least in a portion corresponding to the position where a heat sensitive element arranged inside the gap is located. By forming the die from a material having good heat conductivity in the portion corresponding to the position of the heat sensitive element, heat of the filled resin conducts well to that portion made of the heat conductive material, whereby heat conduction from the resin to the heat sensitive element is reduced. The battery pack of the rechargeable battery united with the substrate by resin molding is thus produced without the risk of destroying the heat sensitive element by the heat of the filled resin.

BEST MODE FOR CARRYING OUT THE INVENTION

Preferred embodiments of the present invention will be hereinafter described with reference to the accompanying drawings for an understanding of the invention. It should be understood that the following embodiments of the invention are merely given as examples and should not limit the technical scope of the invention.

The present embodiment shows one example of a battery pack employing a flat prismatic lithium ion rechargeable battery applied to a mobile phone. Battery packs for mobile phones need to be small, light-weight, and thin, and in addition, they are desired to have a high energy density in accordance with high functionality, a high mechanical strength to withstand impacts caused by a falling accident which is inevitable with portable equipment, a structure that does not allow easy disassembling, and safety features for protecting the rechargeable battery from short circuits, overcharge, and high temperature. The battery pack described below satisfies all these requirements.

Figure 1:
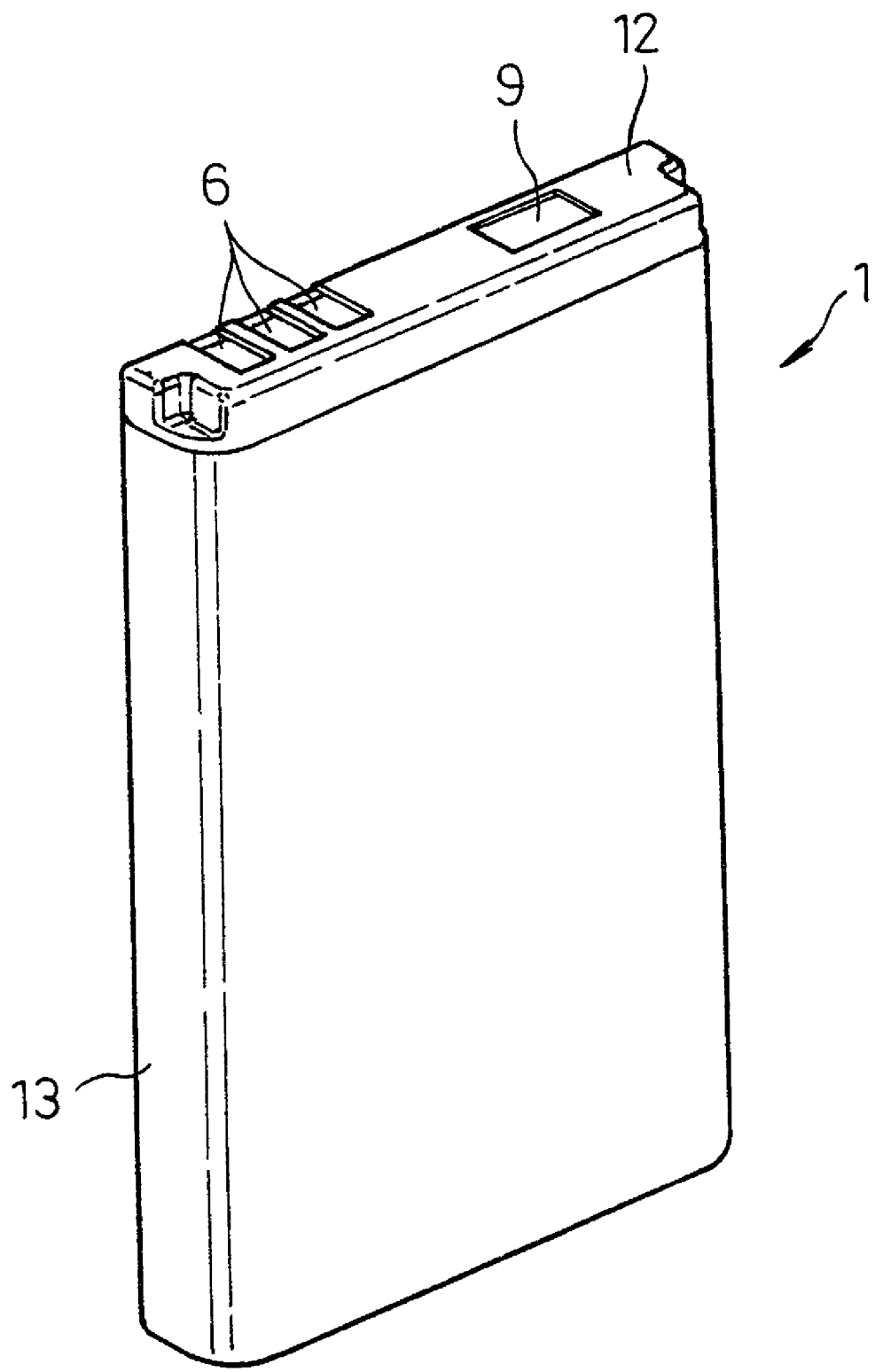
FIG. 1 is a perspective view illustrating an external appearance of a battery pack according to one embodiment of the invention.
Figure 2:
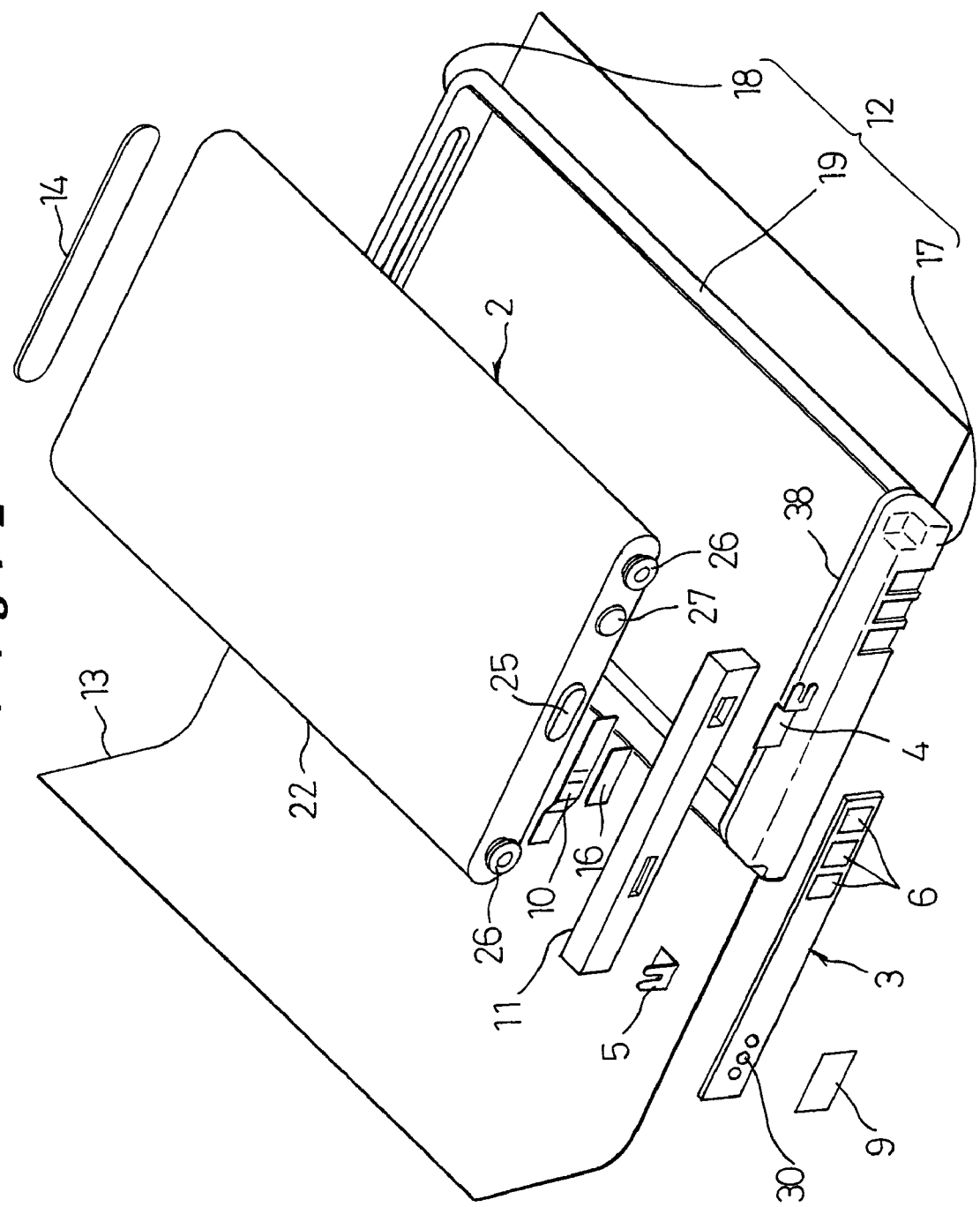
FIG. 2 is an exploded perspective view illustrating various constituent elements of the above battery pack.

FIG. 1 is an outer representation of the battery pack 1 according to this embodiment. On one end face of the flat battery pack are exposed external terminals 6 consisting of a positive terminal, a negative terminal, and a temperature detecting terminal, and bonded a water ingress label 9. FIG. 2 is an exploded view of this battery pack 1 showing its constituent elements. These elements and a manufacturing method of the battery pack 1 will be described below in detail.

Figure 3A:
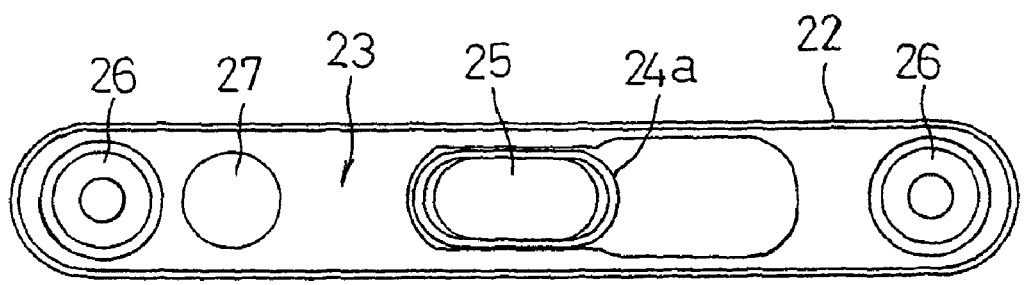
FIG. 3A is a plan view illustrating the structure of a rechargeable battery.
Figure 3B:
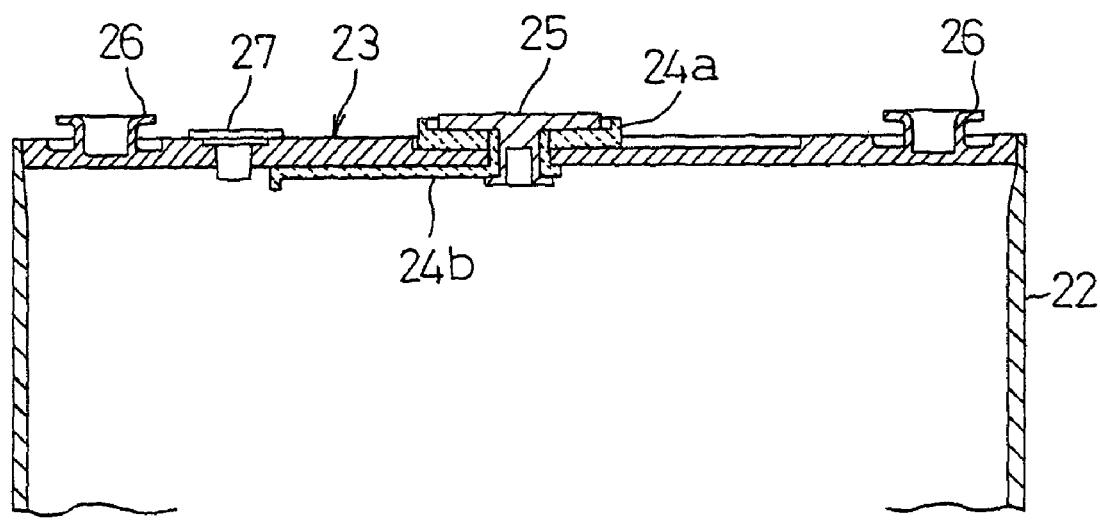
FIG. 3B is a cross section of the rechargeable battery on the side of a sealing plate.

The lithium ion rechargeable battery (hereinafter rechargeable battery) 2 accommodates elements for electromotive force in a bottomed tube-like aluminum case 22 having an oval cross section as can be seen from FIGS. 3A to 3B, the open end of the case 22 being sealed with a sealing plate 23 by laser welding. The sealing plate 23 is joined to the case 22 and serves as the battery's positive electrode; the battery's negative electrode 25 is electrically insulated from the sealing plate 23 by an upper gasket 24a and a lower gasket 24b and protruded at the center of the sealing plate 23. On both sides of the sealing plate 23 are mushroom-shaped engaging protrusions 26, 26 that are provided by press-forming. Reference numeral 27 denotes a plug for closing a hole for pouring electrolyte; after the injection of electrolyte into the case 22, the hole is closed by the plug 27, which is then welded to the sealing plate 23.

The engaging protrusions 26 are formed into the mushroom shape as shown by first pressing the sealing plate 23 to provide cylindrical projections at preset locations on the sealing plate 23 and spreading the tops of the projections by pressing. Pressing is not the only way to form the engaging protrusions 26; they may be formed by welding mushroom-shaped or inverted L shape members onto the sealing plate 23, as will be described later.

Figure 3C:
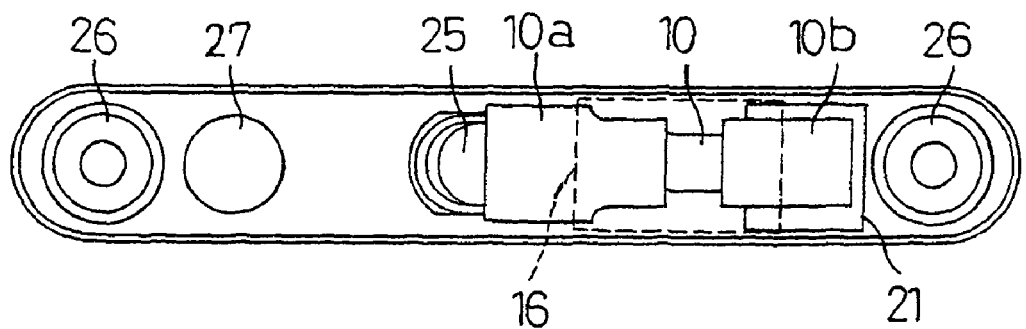
FIG. 3C is a plan view illustrating the rechargeable battery to which a temperature fuse is attached.

To the negative electrode 25 of this rechargeable battery 2 is spot-welded a connection piece 10a at one end of a temperature fuse (heat sensitive element) 10 as shown in FIG. 3C. A heat insulation sheet 16 is affixed upon the upper face of the temperature fuse 10 as indicated by broken lines, so as to prevent fusion of the temperature fuse 10 during the resin filling process to be described later. The heat insulation sheet 16 used here is a 0.6 mm thick acrylic foam sheet (VHB: Sumitomo 3 M Ltd.) consisting of a foamed acrylic resin sheet provided with an adhesive layer, but other materials may also be used as will be described later. A connection piece 10b at the other end of the temperature fuse 10 is placed upon an insulating paper 21 affixed on the sealing plate 23 and connected to a negative lead plate 5 to be described later. The temperature fuse 10 is fixed on the sealing plate 23 by heat conductive adhesive so as to be heat-coupled to the rechargeable battery 2.

Figure 4A:
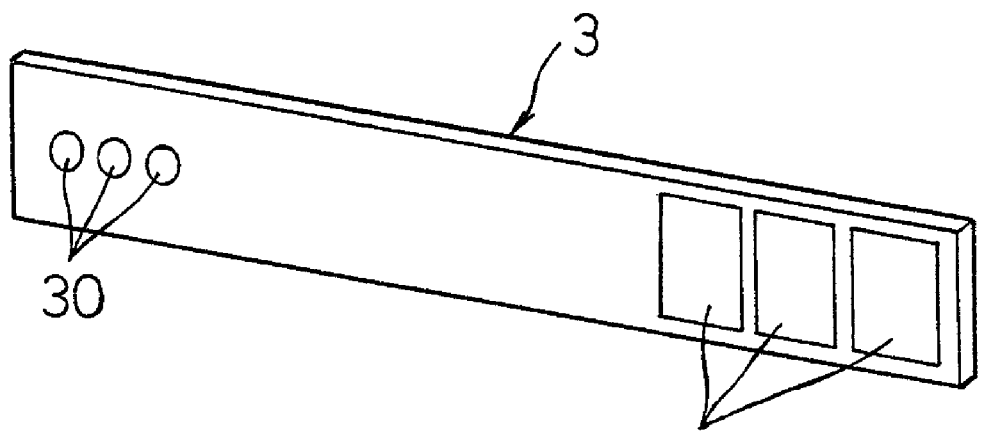
FIG. 4A is a perspective view illustrating the structure of a circuit substrate on the outer side.
Figure 4B:
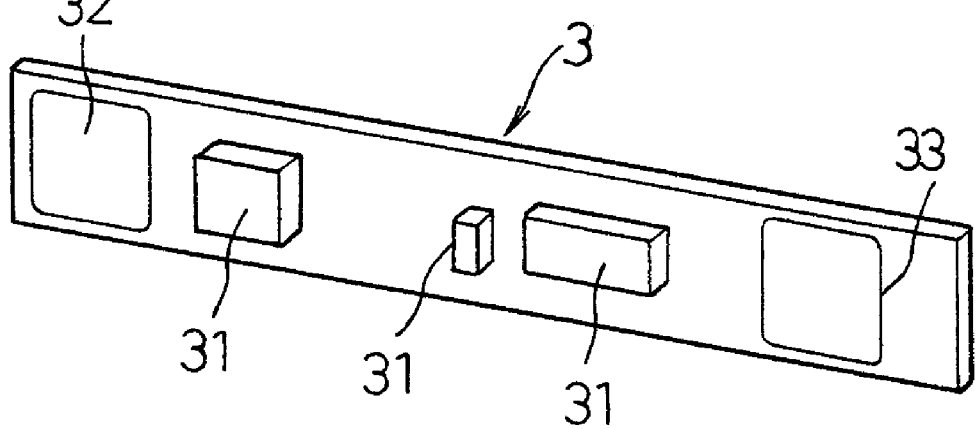
FIG. 4B is a perspective view illustrating the structure of the circuit substrate on the inner side.
Figure 4C:
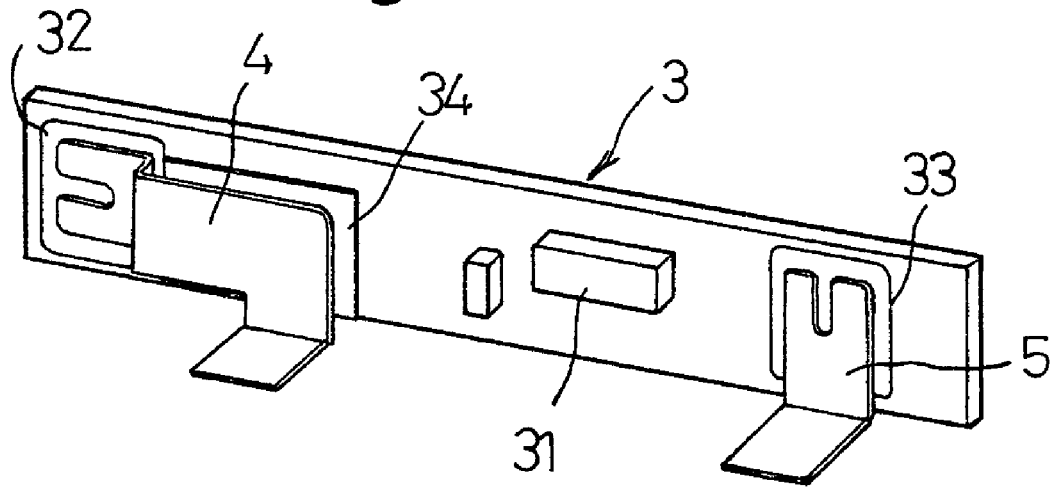
FIG. 4C is a perspective view illustrating the circuit substrate to which a lead plate is attached.

The circuit substrate 3 includes a circuit for protecting the rechargeable battery 2 from overcharge, over discharge, and over current; on one side that is on the outside are formed the aforementioned external terminals 6 and the test terminal 30 as shown in FIG. 4A, and on the other side that is on the side of the rechargeable battery 2 are mounted electronic components 31 such as ICs and positive and negative solder lands 32, 33 at both ends for the connection with the rechargeable battery 2, as shown in FIG. 4B. Incidentally, circuit patterns and through holes on the circuit board 3 are not shown in these drawings. one end of a positive lead plate (connecting member) 4 is soldered to the positive solder land 32, with a piece of insulating paper 34 interposed between the lead plate 4 and the electronic components 31, and one end of the negative lead plate (connecting member) 5 is soldered to the negative solder land 33.

Figure 5A:
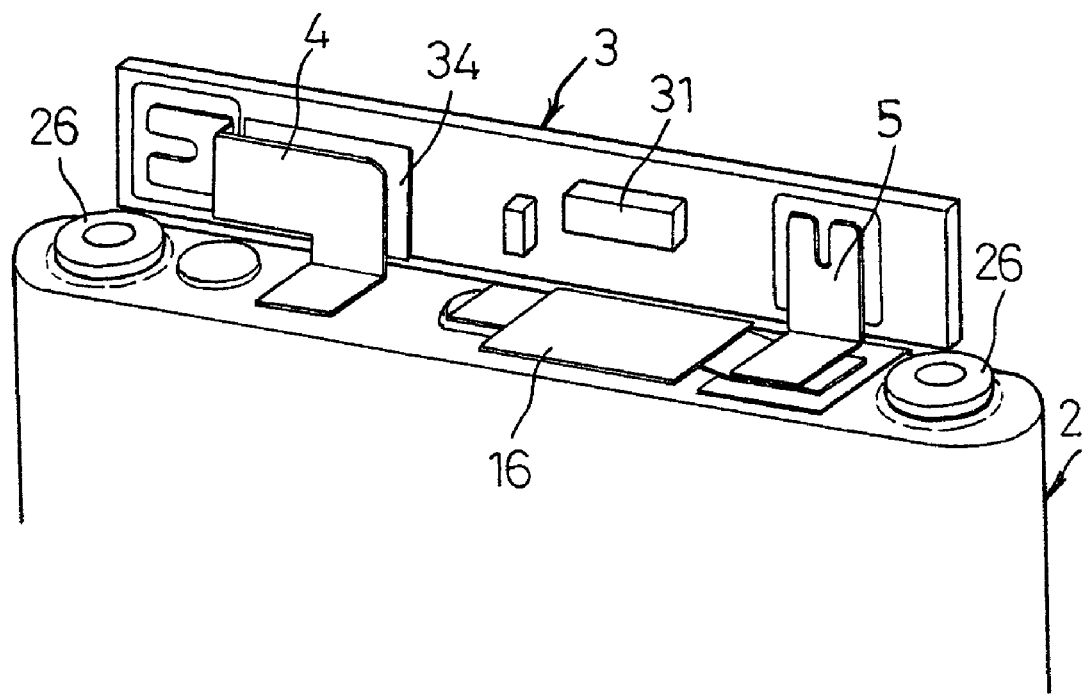
FIG. 5A and FIG. 5B are perspective views illustrating how the circuit substrate is attached to the rechargeable battery.
Figure 5B:
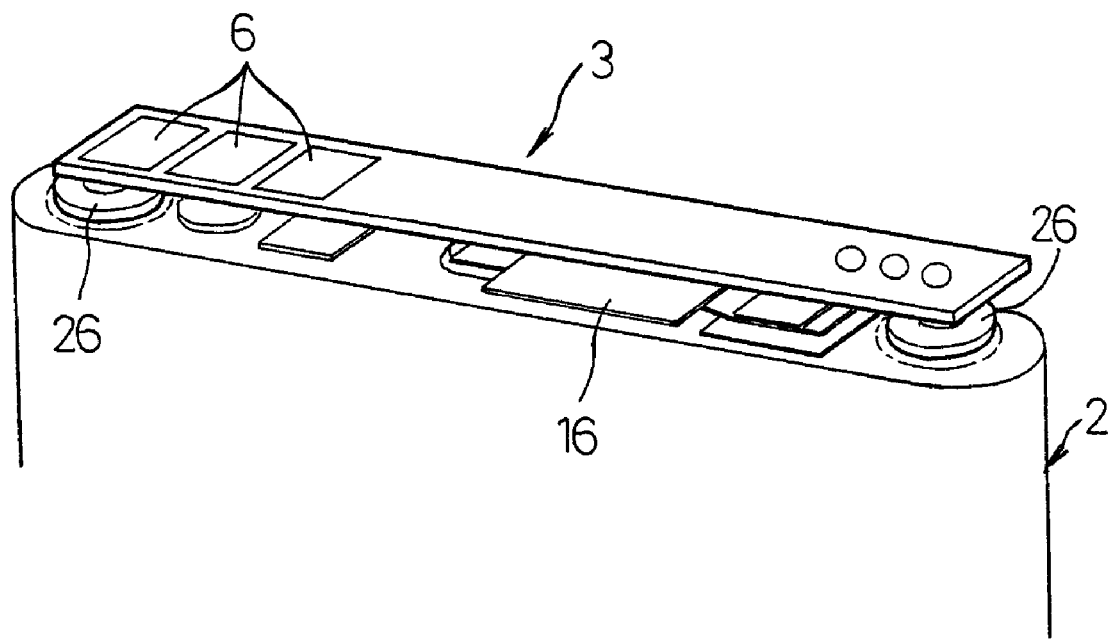
Figure 11A:
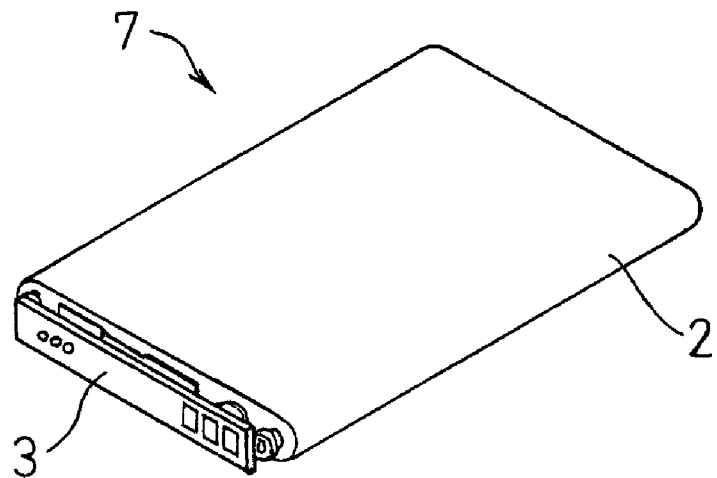
FIG. 11A to FIG. 11C are perspective views illustrating a formation process of production steps in chronological order.

After establishing these connections, the circuit substrate 3 is set relative to the rechargeable battery 2 as shown in FIG. 5A such that the other end of the positive lead plate 32 is spot-welded on the face of the sealing plate 23, and the other end of the negative lead plate 33 on the connection piece 10b of the temperature fuse 10. The circuit substrate 3 is orthogonal to the face of the sealing plate 23 in this connection state; the positive and negative lead plates 4, 5 are then bent over so that the circuit substrate 3 is substantially parallel to the sealing plate 23 with a certain gap therebetween, as shown in FIG. 5B. The rechargeable battery 2 with the circuit substrate 3 thus connected thereto constitutes an object 7 to be resin packed shown in FIG. 11A.

Resin is filled between the rechargeable battery 2 and the circuit substrate 3 of the object 7 to be resin packed to integrate them. It is important to ensure that the height H from the bottom face of the rechargeable battery 2 to the surface of the circuit substrate 3 where the external terminals 6 are formed is precisely controlled in the resin molding process; the following is a description of a manufacturing method in which this is achieved.

Figure 6:
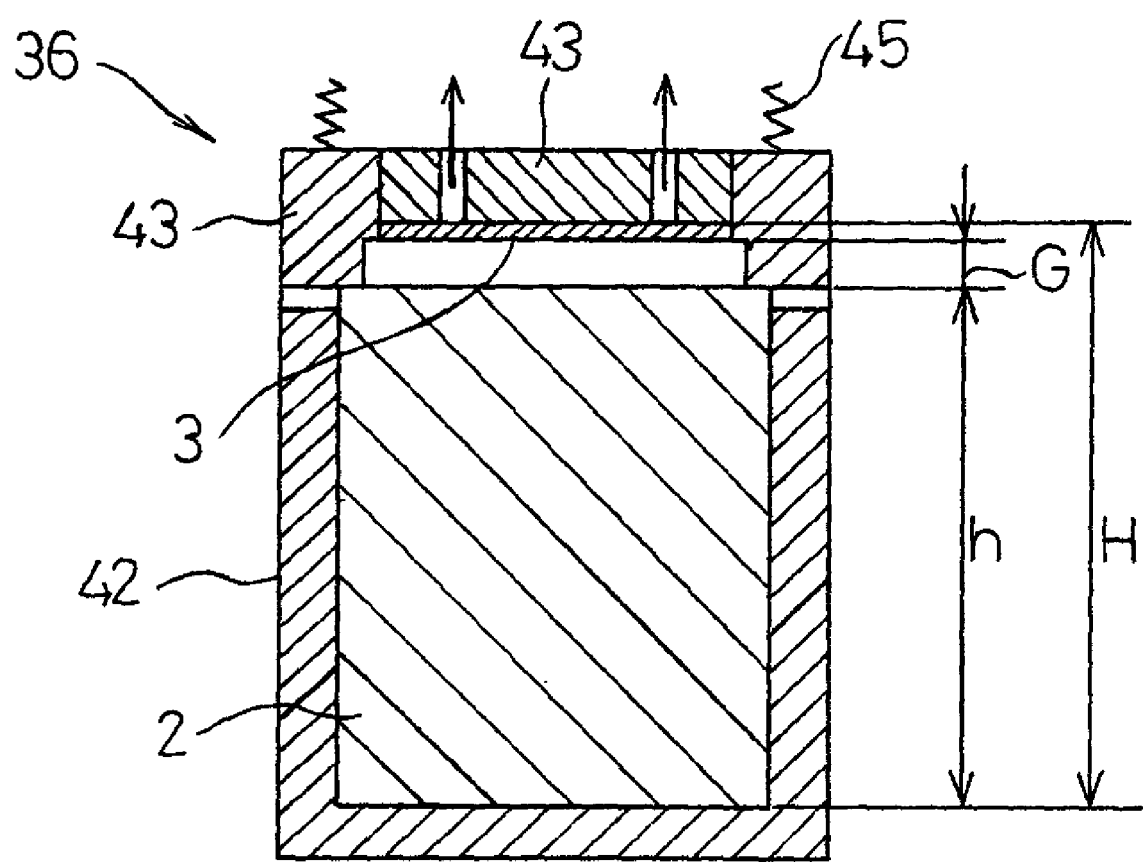
FIG. 6 is a schematic view for explaining how positioning is achieved by a molding die.

As shown in FIG. 6, a lower die 36 of the primary molding die 35 includes a movable part 41 that is movable towards a stationary part 42 by biasing means 45, and the movable part 41 is provided with a vacuum suction part 43. The object 7 to be resin packed (only the rechargeable battery 2 and the circuit substrate 3 being illustrated in the drawing) is placed inside the lower die 36 with the movable part 41 retracted, which is then moved forward for the positioning of the rechargeable battery 2, with its bottom being pressed against the inner wall of the stationary part 42. The circuit substrate 3, on the other hand, makes tight contact with the wall of the vacuum suction part 43 and is kept in position.

The height H from the bottom face of the rechargeable battery 2 to the surface of the circuit substrate 3 where the external terminals 6 are formed varies because of variations in the height h of the rechargeable battery 2 and in the position of the circuit substrate 3; with the above structure, however, the circuit substrate 3 is fixed in position by vacuum suction, while the movable part 41 changes its position in accordance with the height h of the rechargeable battery 2, so that the clearance G between the rechargeable battery 2 and the circuit substrate 3 placed inside the lower die 36 is variable, whereby the height H from the bottom face of the rechargeable battery 2 to the surface of the circuit substrate 3 where the external terminals 6 are formed is made constant.

Figure 7:
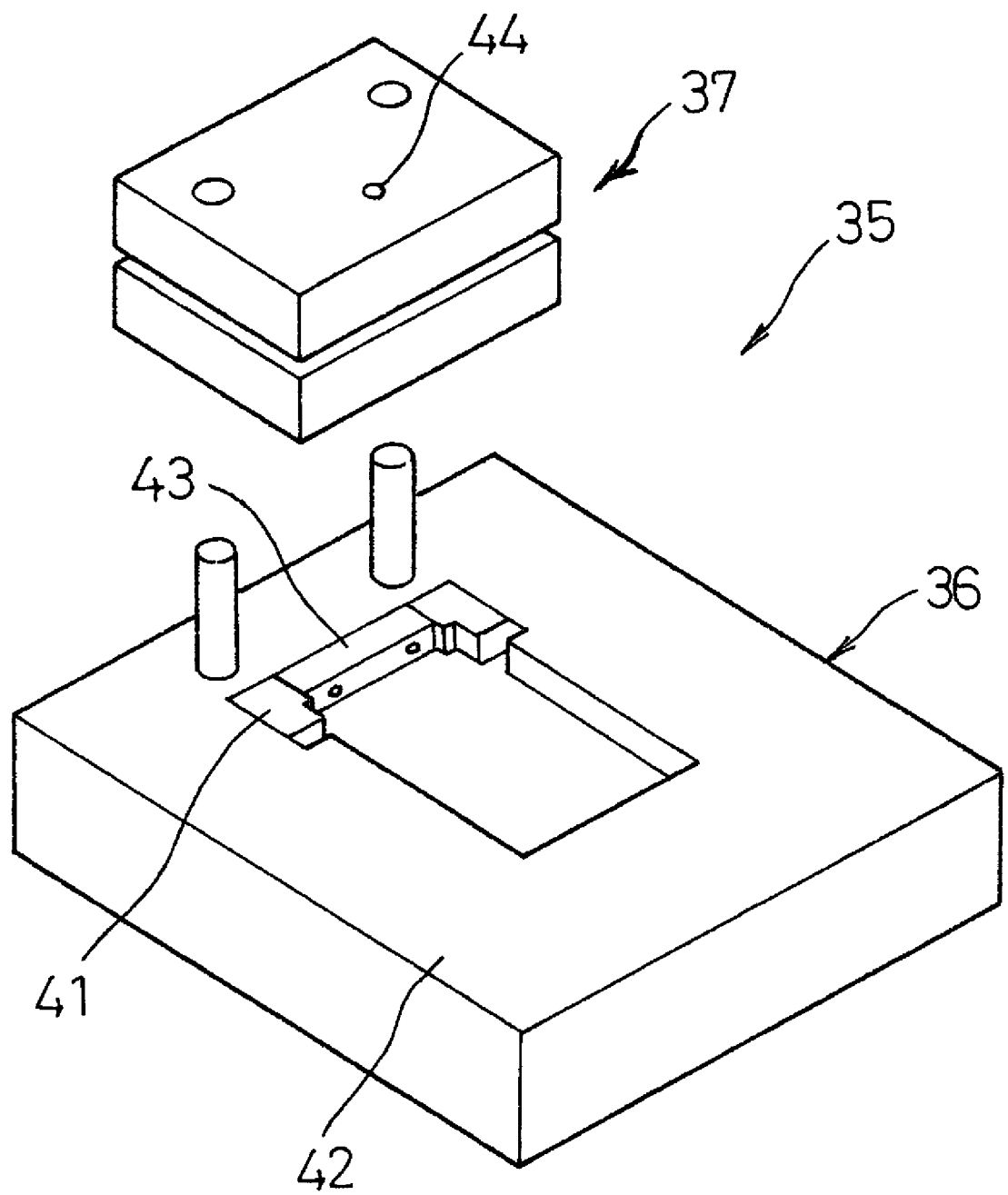
FIG. 7 is a perspective view illustrating the structure of a primary molding die.
Figure 8:
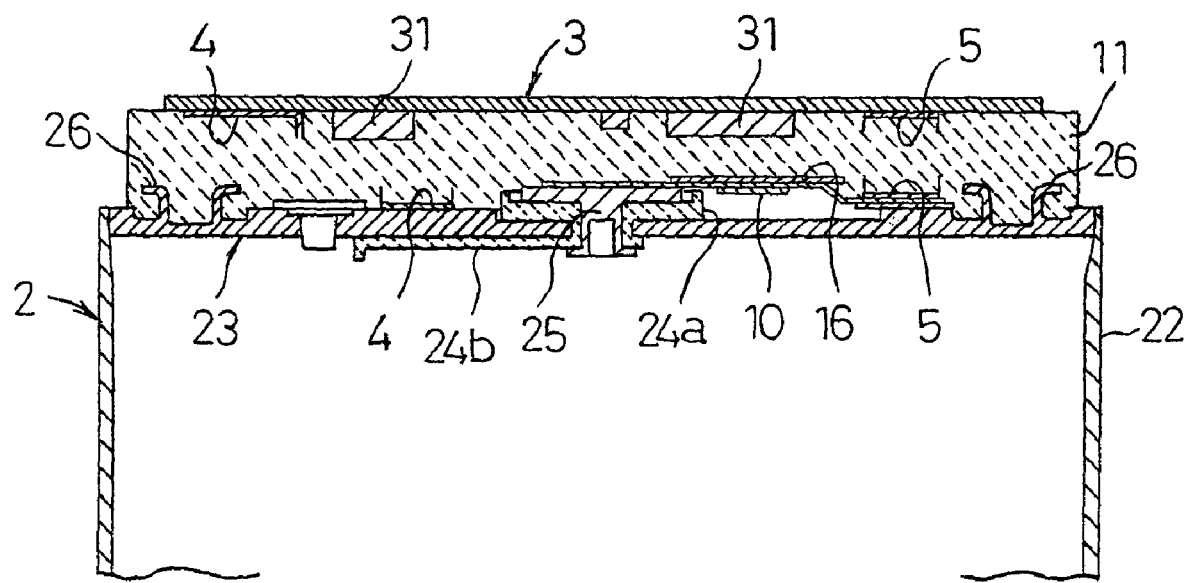
FIG. 8 is a cross-sectional view illustrating a resin mold formed by the primary molding.

An upper die 37 shown in FIG. 7 is lowered onto the lower die 36 in which the rechargeable battery 2 and the circuit substrate 3 are placed in position, and resin is injected from a gate 44 in the upper die 37 into the gap between the rechargeable battery 2 and the circuit substrate 3. The injected resin surrounds the electronic components 31 and positive and negative lead plates 4, 5 on the circuit substrate 3 and bonds to the circuit substrate 3, as well as surrounds the undercut portions of the engaging protrusions 26 on the sealing plate 23 of the rechargeable battery 2 and bonds to the sealing plate 23, as shown in FIG. 8. Hot melt resins are preferably used because they melt at a temperature that does not adversely affect the electronic components 31, battery 2, and temperature fuse 10, and cure as the temperature lowers.

Even though the resin melts at a relatively low temperature, it is still as hot as 200° C.; if it contacts the temperature fuse 10 whose fusion temperature is set 104° C., it may cause fusion of the fuse and destroy the function of the battery pack 1. As a countermeasure, the heat insulation sheet 16 is affixed to cover the temperature fuse 10 as mentioned above so as to provide a shield from heat of resin for the temperature fuse 10.

Figure 11B:
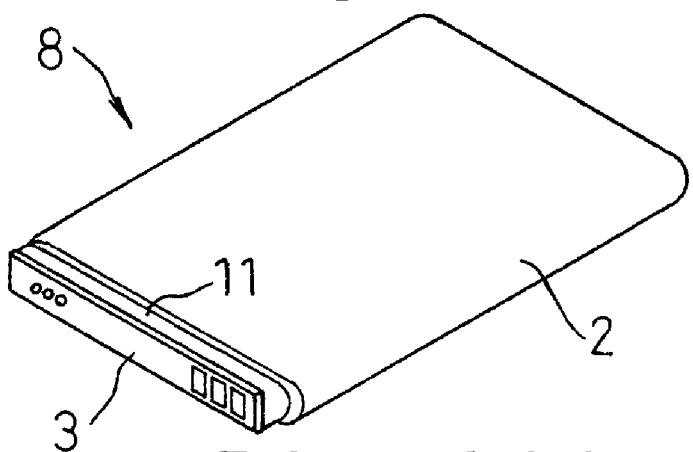

After curing the filled resin, the upper die 37 is opened, vacuum suction by the vacuum suction part 43 stopped, and the movable part 41 retracted, an intermediate product 8 shown in FIG. 11B, which consists of the rechargeable battery 2 and the circuit substrate 3 united by a primary mold 11 that is formed by the cured resin, is taken out from the lower mold 36. This intermediate product 8 is made into a battery pack 1 by providing an outer covering.

The outer covering is provided by a secondary molding process and a winding sheet affixing process. An insulator 14 is attached to the bottom face of the rechargeable battery 2 before the secondary molding.

Figure 9:
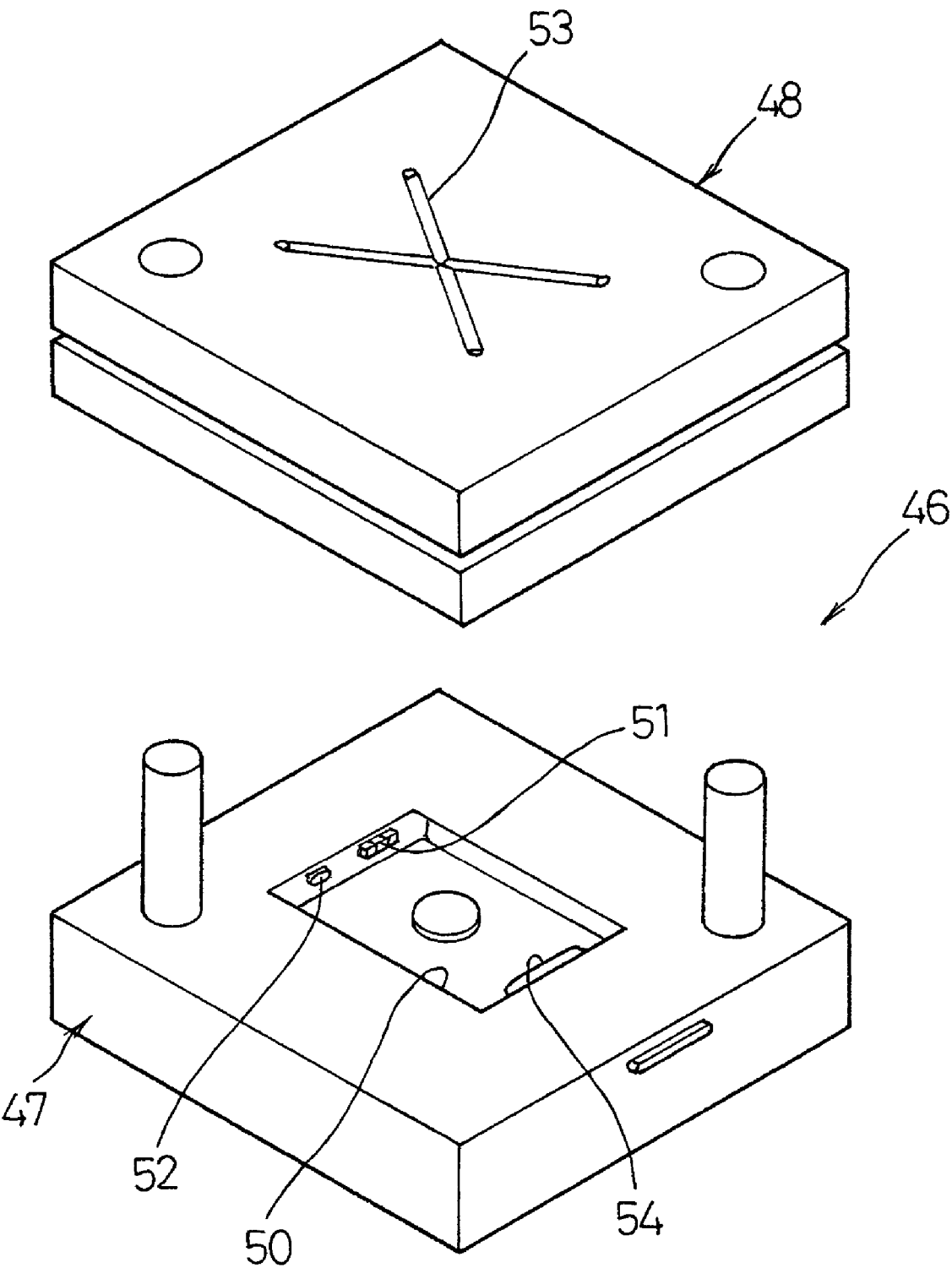
FIG. 9 is a perspective view illustrating the structure of a secondary molding die.

In the secondary molding, the intermediate product 8 is placed in a secondary molding die 46 shown in FIG. 9, so that predetermined parts of the intermediate product 8 are packed with resin. A lower die 47 of the secondary molding die 46 has a cavity 50 for accommodating the intermediate product 8; in a wall on one side of the cavity 50 are provided inwardly biased projections 51, 52 for the three external terminals and test terminal, and in the opposite wall is provided an inwardly biased projection 54 for the bottom face of the battery. When the intermediate product 8 is placed in the cavity 50 and these projections 51, 52, 54 are moved forward, the projections 51 make pressure contact with the external terminals 6 at three locations on the circuit substrate 3, and the projection 54 with the insulator 14 bonded on the bottom face of the rechargeable battery 2, respectively.

Figure 10:
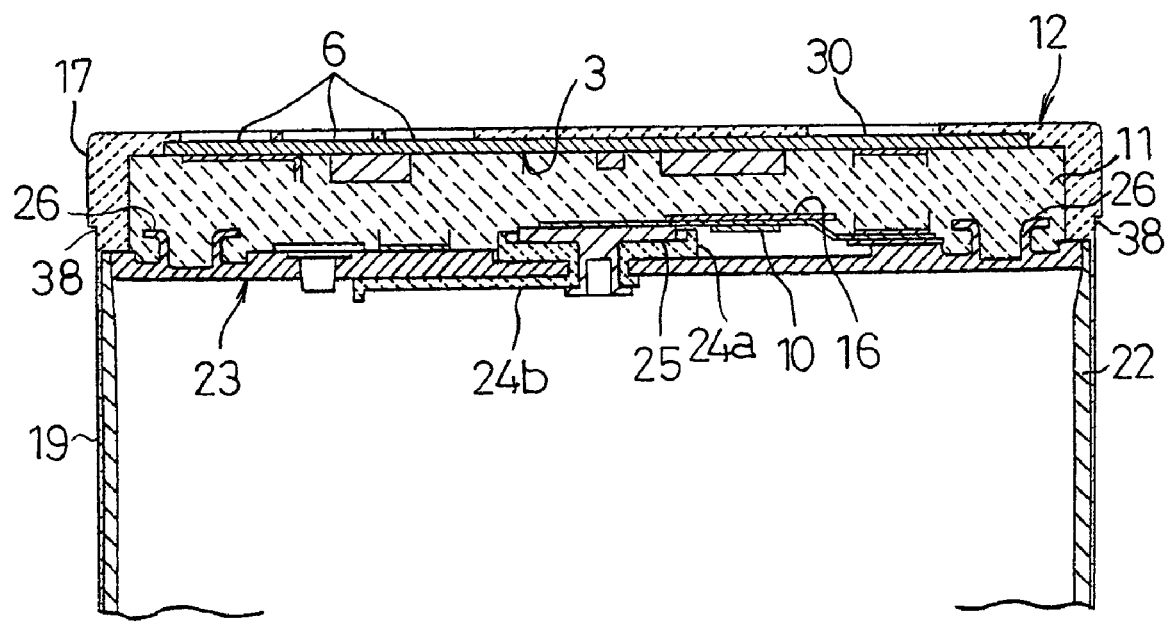
FIG. 10 is a cross-sectional view illustrating a resin mold formed by the secondary molding.
Figure 11C:
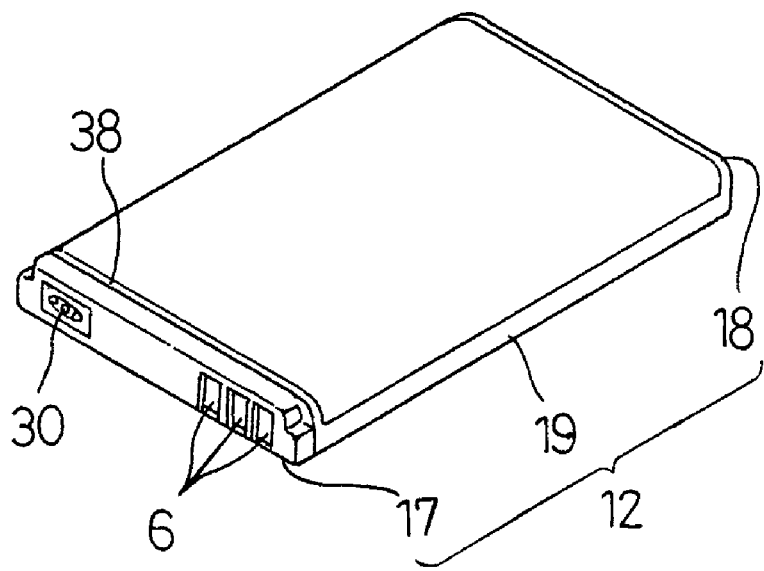
Figure 12:
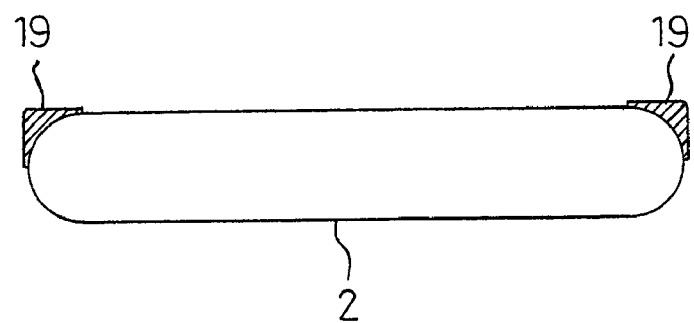
FIG. 12 is a cross-sectional view for explaining where a connecting part is formed.

The lower die 47 in this state is then closed by an upper die 48, and resin is filled from a gate 53 in the upper die 48 into the secondary molding die 46. The resin is injected into the die 46 from four locations for forming the following: An upper mold 17 fixed on the sealing plate 23 of the rechargeable battery 2 as shown in FIG. 11C and covering the circuit substrate 3 and the primary mold 11 while exposing the external terminals 6 and the test terminal 30 of the intermediate product 8 to the outside as shown in FIG. 10; a lower mold 18 fixed on the bottom face of the rechargeable battery 2 to a predetermined thickness such as to surround the insulator 14; and a connecting part 19 for coupling the upper mold 17 and the lower mold 18 along two corners on one side of the rechargeable battery. The connecting part 19 is formed such that the two parts of the arc on one side of the oval cross section of the rechargeable battery 2 at 90 degrees are right-angled, as shown in FIG. 12. The upper mold 17, the lower mold 18, and the connecting part 19 together form the secondary mold 12 shown in FIG. 2.

The upper mold 17 has a step 38 in its periphery near the rechargeable battery, which defines a positioning line along which a winding sheet 13 is wound around the periphery of the rechargeable battery 2. The battery operation is then inspected using the test terminal 30, and the water ingress label 9 is bonded in the cavity surrounding the test terminal 30 of the batteries that have passed the inspection to cover the test terminal 30, whereby the battery pack 1 shown in FIG. 1 is obtained.

The battery pack 1 thus formed has curved shoulders on one flat side corresponding to the arc on both sides of the rechargeable battery 2, while the other two corners on the opposite side are right-angled because of the connecting part 19; this feature, coupled with the asymmetric arrangement of the external terminals 6, prevents the battery to be reversely loaded in equipment. The curved corners will snugly fit in rounded corners in the battery accommodation case of the equipment without leaving any dead space.

In the above structure, the heat insulation sheet 16 is affixed to prevent destruction or degeneration of the heat sensitive element such as the temperature fuse 10 because of the heat of molded resin; another possibility is to means for reducing thermal effects of molten resin on the heat sensitive element during the period in which the resin cures. Such heat insulation may be achieved either by affixing a heat insulation sheet on the heat sensitive element, or by covering the heat sensitive element with resin having heat insulating properties.

Heat insulating resins that are preferably used for covering the heat sensitive element should have a higher melting temperature than that of the filled resin, and include polyphenylene sulfide (PPS), polyamide (PA), polyamideimide (PAI), polyimide (PI), and polyetheretherketone (PEEK). More preferably, the heat insulating resin should have a good bond with the filled resin.

The heat insulation sheet affixed on the heat sensitive element may be a foamed acrylic resin or polyurethane sheet, or a sheet made of the above heat insulating resins, polyurethane, liquid crystal polymers, phenolic resins, or fluorine resins. Alternatively, a ceramic, glass wool, or glass cloth sheet impregnated with heat resistant resin may also be employed. These sheets should preferably have a thickness of about 0.3 to 1.0 mm for the purposes of heat insulation from molten resin and protection from injection pressure.

Other countermeasures to prevent thermal effects of resin on the temperature fuse 10 when molding resin between the rechargeable battery 2 and the circuit substrate 3 include the following structure or molding method.

Figure 13:
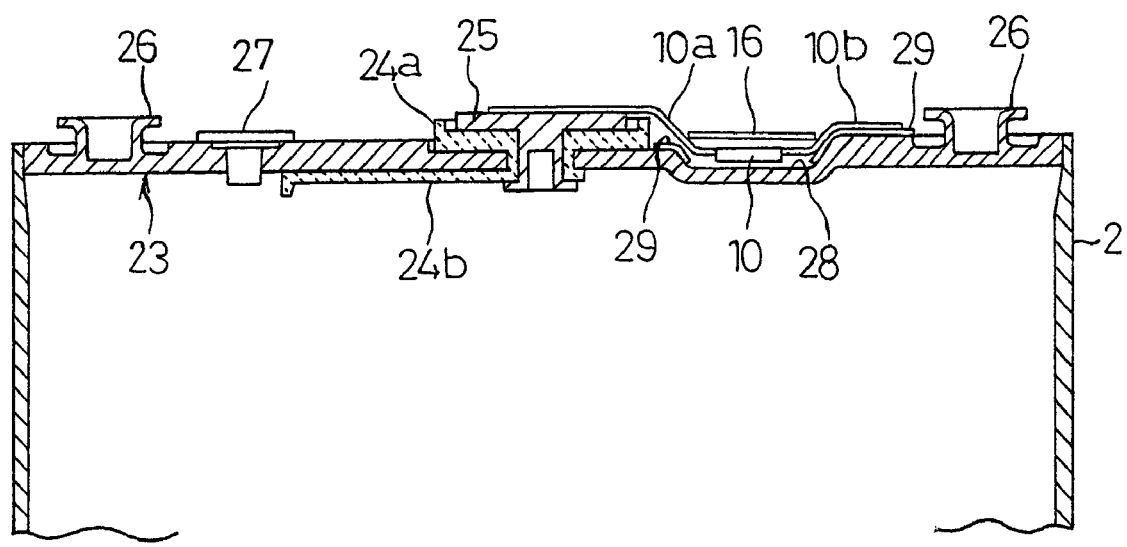
FIG. 13 is a cross-sectional view illustrating an alternative structure for installing a temperature fuse.

As shown in FIG. 13, a recess 28 is formed in the sealing plate 23 of the battery 2, and the temperature fuse 10 is placed inside this recess 28. A heat insulation sheet 16 may be affixed above the temperature fuse 10 such as to close the open top of the recess 28, or other constituent elements may be employed for stopping resin from flowing into the recess 28, to achieve the same effect. With the latter structure, the heat of the rechargeable battery 2 conducts to the temperature fuse 10 better, i.e., the temperature fuse 10 detects an abnormal temperature rise in the rechargeable battery 2 with higher precision and response speed. The connection pieces 10a, 10b at both ends of the temperature fuse 10 are insulated from the sealing plate 23 respectively by the insulating paper 29, 29, while the body of the temperature fuse 10 is fixed inside the recess 28 with a heat conductive adhesive (e.g. silicon resin) and heat-coupled to the rechargeable battery 2.

A portion of the primary molding die 35 where the temperature fuse 10 will be located may be formed of a material having good heat conductivity (e.g. aluminum) so as to diffuse heat from the resin into the die and reduce heat conduction to the temperature fuse 10, whereby fusion of the temperature fuse 10 during the resin molding is prevented.

Alternatively, the entire primary molding die 35, or at least the stationary part 42 of its lower die 36 may be formed of a material having good heat conductivity (e.g. aluminum alloy) so as to enhance heat conductivity of the portion where the temperature fuse 10 will be located.

Further, both the primary and secondary molding dies 35, 46 are formed with an insulating layer in the parts where active parts of the object 7 to be resin packed or the intermediate product 8 such as positive and negative lead plates 4, 5, external terminals 6 and test terminal 30 will be located, so as to prevent short circuits or leaks caused by a contact between the active parts and molding dies. The insulating layer should preferably be formed on the aluminum molding dies by alumite processing or fluorine resin coating processing so that the dies will have insulation as well as excellent heat conductivity.

The heat insulation sheet is provided as a shield from heat of molding resin for the temperature fuse in the above-described structure, but a connection lead for electrically connecting the rechargeable battery with the substrate may be used instead of the heat insulation sheet to cover the temperature fuse so as to shield it from the heat of the molding resin.

The temperature fuse 10 in the above-described structure may be replaced by a PTC element. As well known, a PTC element functions by increasing its normally small resistance in response to a temperature rise to a preset value to stop current flow. When a large current flows because of a short circuit, for example, the PTC element generates heat to increase resistance to limit the current flow. If heat-coupled to the rechargeable battery 2, it increases resistance in response to an abnormal temperature rise in the rechargeable battery 2 to instantaneously limit the current flow that is causing the temperature rise and stops the temperature rise.

A direct contact of molten resin during the molding with the PTC element may destroy its function. Accordingly, a heat shield structure should be provided similarly to the case with the temperature fuse 10.

Also, the temperature fuse 10 in the above-described structure may be replaced by a bimetal thermostat. A bimetal thermostat has a movable contact formed by two types of metal that have different thermal expansion coefficients, and functions to stop current flow by opening the movable contact in response to a temperature rise to a preset value by deformation caused by the difference in the thermal expansion coefficient. When a large current flows because of a short circuit, for example, it generates heat and raises temperature to stop the current flow. If heat-coupled to the rechargeable battery 2, it senses an abnormal temperature rise in the rechargeable battery 2 and cuts the current flow that is causing the temperature rise to stop the temperature rise.

A direct contact of filled resin during the molding with the bimetal thermostat may adversely affect its function due to heat shock. Accordingly, a heat shield structure should be provided similarly to the case with the temperature fuse 10. Good heat insulation will be provided by covering it with a heat insulation sheet, whereby adverse effects on the bimetal element inside will be avoided reliably.

A bimetal thermostat provided with an outer covering of heat insulating resin excluding the parts that are heat-coupled to the rechargeable battery shields itself from heat during the resin molding, and with such a thermostat, no heat insulation sheet will be necessary.

Some of these heat sensitive elements with different operating temperatures may be used in combination according to the design.

In addition to the heat sensitive element heat-coupled to the rechargeable battery 2, a pattern fuse that has an irreversible current cutting function and stops current flow when the current exceeds a preset limit may be provided on the circuit substrate 3, so as to improve the reliability of the battery pack with several elements having current limiting/cutting functions. In this case, too, the molten resin will adversely affect the pattern fuse similarly to the case with the temperature fuse 10 and PTC element, causing deterioration in various characteristics of the pattern fuse as mentioned in the paragraph describing the problem to be resolved by the invention. Therefore, the circuit substrate 3 should include an element that shields the pattern fuse portion from heat of the molding resin. More specifically, the structure wherein a heat shield is provided by constituent elements except for the resin as set forth in the present description, or, the structure wherein a heat insulation member is provided as also set forth in the present description may be adopted to achieve the effect of eliminating thermal effects as has been described in the foregoing.

INDUSTRIAL APPLICABILITY

According to the present invention, as described above, when uniting the rechargeable battery and the substrate formed with external terminals with a gap therebetween by filling resin in the gap to form the battery pack, measures are taken so that the heat sensitive element placed in the gap is not destroyed by the heat of the filled resin; the invention thus provides a battery pack that has a resin-packed rigid structure.

The invention claimed is:

1. A battery pack comprising:
   a rechargeable battery having a plate at an external surface of the battery at a first side of the battery for sealing in battery content;
   a circuit substrate having an external terminal portion and overcharge, undercharge and overcurrent protecting means,
   said substrate being arranged on an external side of the sealing plate, a gap occurring between the substrate and the sealing plate for receiving hot melt resin;
   said resin serving to unite the substrate with the rechargeable battery and to seal space between the substrate's external terminal portion and the battery's sealing plate,
   said sealing plate defining a recess which defines a trough in said sealing plate,
   a heat sensitive element having an active portion arranged in the trough and being elevated relative to the sealing plate with a void therebetween, another portion of the heating sensitive element being heat-coupled to the rechargeable battery, and
   a heat shield comprising constituent elements of the battery pack other than the resin,
   wherein said constituent elements of the battery pack other than the resin cover the recess so as to prevent the resin from contacting surfaces of the heat sensitive element during filling of said gap with said resin.

2. A battery pack comprising:
   a rechargeable battery having a plate at an external surface of the battery at a first side of the battery for sealing in battery content;
   a circuit substrate having an external terminal portion and overcharge, undercharge and overcurrent protecting means,
   said substrate being arranged on an external side of the sealing plate, a gap occurring between the substrate and the sealing plate for receiving hot melt resin;
   said resin serving to unite the substrate with the rechargeable battery and to seal space between the external terminal portion and the battery sealing plate,
   a heat sensitive element being heat-coupled to the rechargeable battery, said heat sensitive element being arranged in a recess formed in the sealing plate, said recess defining a trough in said sealing plate, and
   said heat sensitive element having an active portion arranged in said trough and being elevated relative to the sealing plate with a void therebetween, and
   a heat insulation member covering said recess and being positioned within said trough defined by said recess so as to prevent direct contact between the resin and the heat sensitive element thereby attenuating destruction or degeneration of the heat sensitive element by heat from the resin during filling of said gap with said resin.

3. The battery pack according to any one of claims 1 or 2, wherein the heat sensitive element is a temperature fuse.

4. The battery pack according to any one of claims 1 or 2, wherein the heat sensitive element is a PTC element.

5. The battery pack according to any one of claims 1 or 2, wherein the heat sensitive element is a bimetal thermostat.

6. The battery pack according to claim 2, wherein
   said sealing plate comprises a first side facing said gap and a second side facing away from said gap; and
   said recess is in said first side and said second side includes a protrusion corresponding to said recess in said first side.

7. The battery pack according to claim 2, wherein said trough of said recess comprises a portion that is substantially flat and edges which curve in a direction towards said gap.

8. The battery pack according to claim 2, wherein said heat insulation member is a heat insulation sheet which comprises a foamed acrylic resin or a polyurethane sheet or a sheet comprising acrylic resin, liquid crystal polymers, phenolic resins, fluorine resins, polyphenylene sulfide (PPS), polyamide (PA), polyamideimide (PAI), polyimide (PI), or polyetheretherketone (PEEK), or a ceramic, glass wool, or glass cloth sheet impregnated with resin.

9. The battery pack according to claim 8, wherein said heat insulation sheet has a thickness of about 0.3 to about 1.0 mm.

10. The battery pack according to claim 1, wherein said constituent elements of the battery pack except for the resin comprise a connection lead for electrically connecting the rechargeable battery with the substrate.

11. The battery pack according to claim 1, wherein said constituent elements are configured such that said constituent elements prevent a direct contact between said resin and said heat sensitive element.

12. The battery pack according to claim 2, wherein other constituent elements of the battery pack comprise a connection lead, and said heat insulation member and other constituent elements are configured such that said heat insulation member and other constituent elements prevent a direct contact between said resin and said heat sensitive element.

13. The battery pack according to claim 2, further comprising engaging protrusions on said sealing plate, said engaging protrusions being spaced from one another and being spaced from said recess.

14. The battery pack according to claim 1, wherein said constituent elements of the battery pack except for the resin are arranged between said heat sensitive element and said substrate.

15. The battery pack according to claim 2, wherein said heat insulation member and other constituent elements are arranged between said heat sensitive element and said substrate.

16. A battery pack comprising:
- a rechargeable battery comprising positive and negative electrodes and a plate at an external surface of the battery at a first side of the battery for sealing in battery content;
- a circuit substrate having an external terminal portion and overcharge, undercharge and overcurrent protecting means,
- the substrate being arranged on an external side of the sealing plate, a gap occurring between the substrate and the sealing plate for receiving hot melt resin, said sealing plate defining a recess defining a trough;
- a heat sensitive element, disposed entirely within the trough, elevated relative to the sealing plate with a void therebetween, and heat-coupled to the rechargeable battery and electrically connected to either the positive or negative electrode thereof; and,
- disposed on the heat sensitive element, a heat insulation member that is a sheet of thermally insulating material or at least a partial coating of heat-insulating resin material on the heat sensitive element, wherein
- the heat insulation member covers the recess and provides thermal insulation to the heat sensitive element to prevent thermal damage thereto when the gap receives resin.

17. The battery pack of claim 16 wherein the heat sensitive member is a thermal fuse or a PTC element.

18. The battery pack of claim 16 wherein at least a portion of the heat sensitive element is in direct physical contact with the rechargeable battery.

19. The battery pack of claim 16 wherein the heat insulation member is a sheet of thermally insulating material wherein the thermally insulating material comprises at least one material selected from the group consisting of: foamed acrylic resin, polyurethane resin, liquid crystal polymers, phenolic resins, fluorine resins, polyphenylene sulfide, polyamide, polyamideimide, polyimide, polyetheretherketone (PEEK), ceramics, glass wool, and woven or non-woven glass cloth.

20. The battery pack of claim 1, wherein the heat sensitive element is elevated relative to a surface portion of the sealing plate that serves as part of the positive electrode of the battery.

21. The battery pack of claim 1, wherein the heat sensitive element comprises a first end portion, a second end portion and, intervening between said first end portion and second end portion, said active portion, the first end portion being coupled to a negative electrode of the battery, the second end portion separated from the sealing plate by an insulating sheet sandwiched between the second end portion and the sealing plate, a negative lead being in contact with the second end portion.

22. The battery pack of claim 21, wherein the heat shield covers a first face of the heat sensitive element's active portion, in which the first face faces away from the sealing plate, and resin covers said first face and at least portions of both said first end portion and second end portion.

* * * * *